Aug. 23, 1960 S. M. MOREY ET AL 2,949,795
POWER TRANSMISSION FOR MILLING AND THE LIKE MACHINES
Filed June 11, 1956 4 Sheets-Sheet 1

INVENTORS
SIGMUND MOREY
SECONDO L. CASELLA
BY
*J. B. Felshin*
ATTORNEY

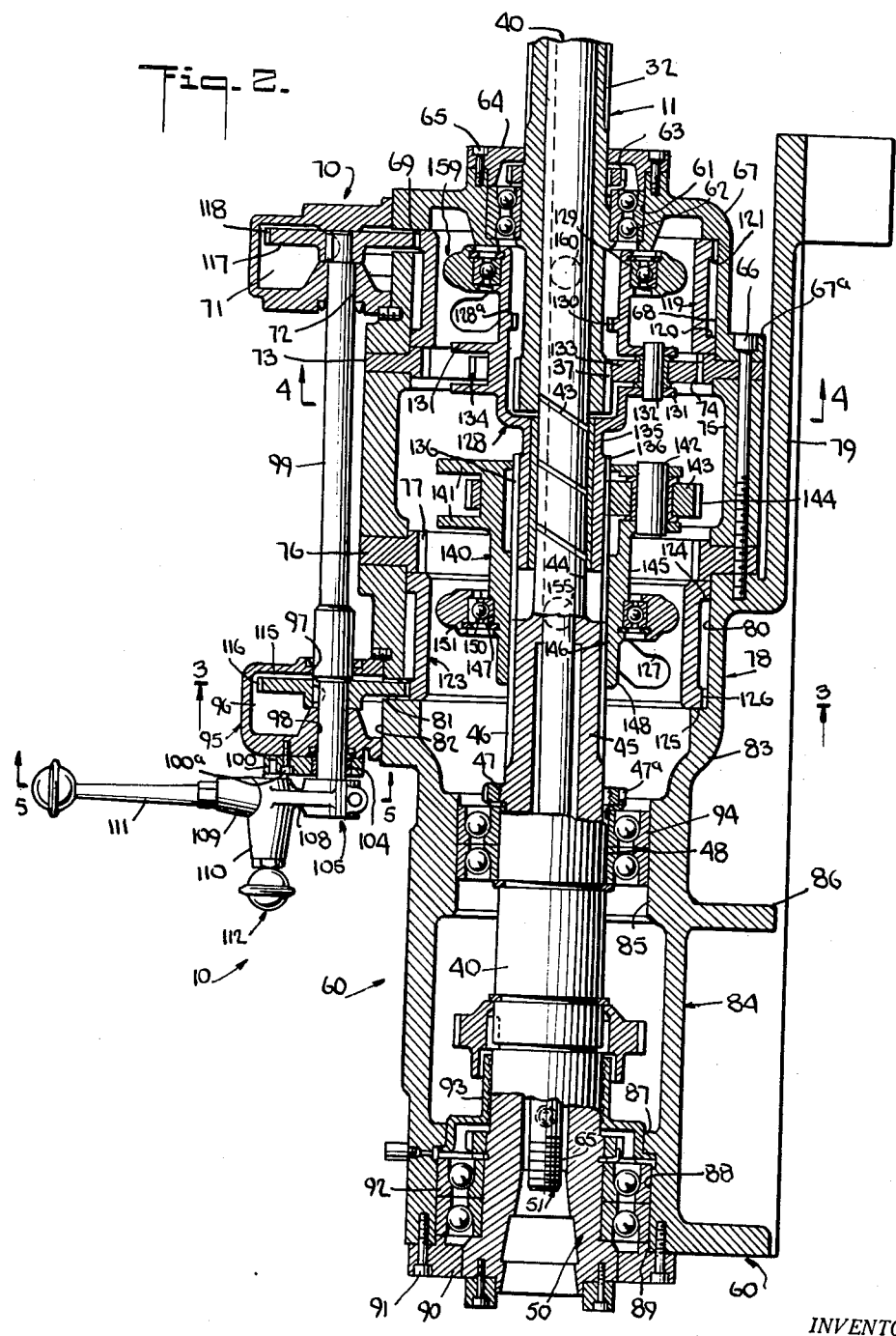

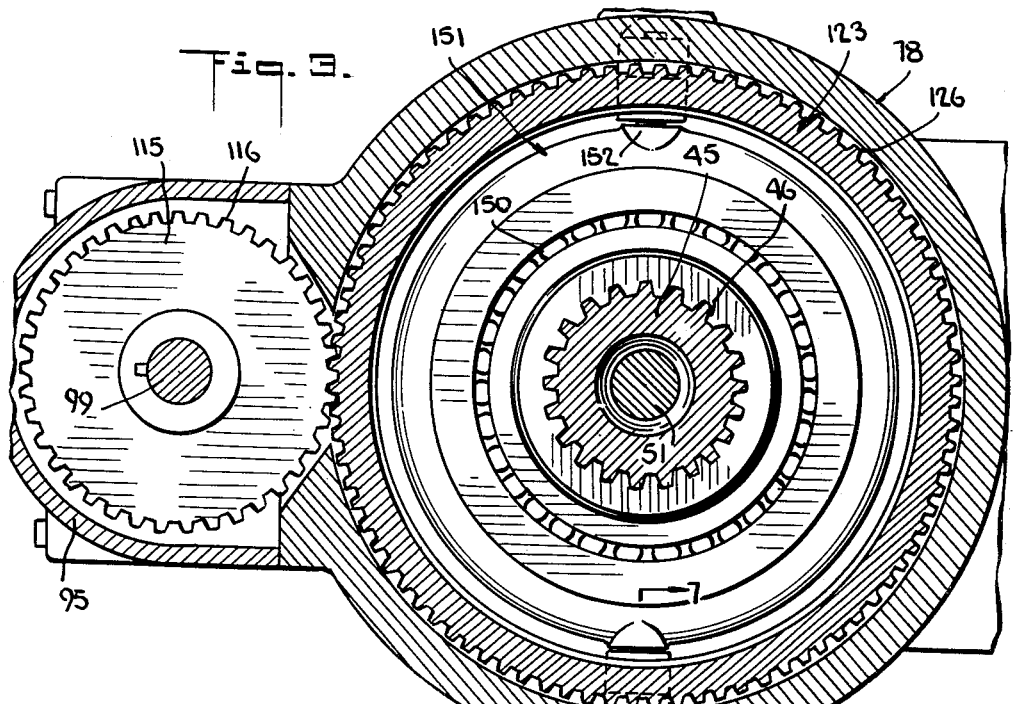
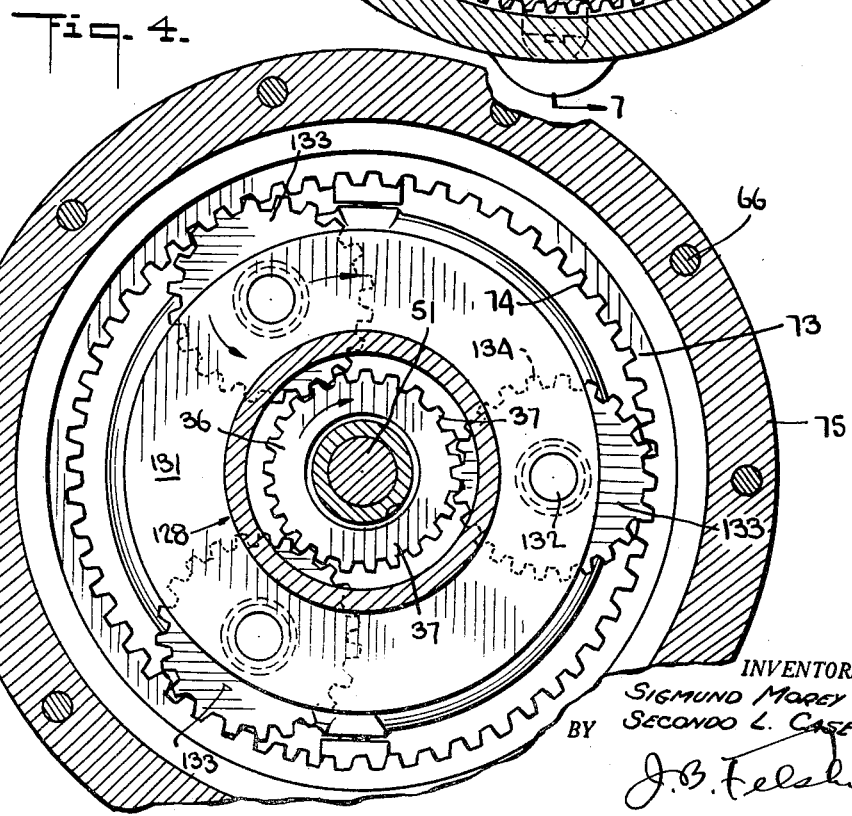

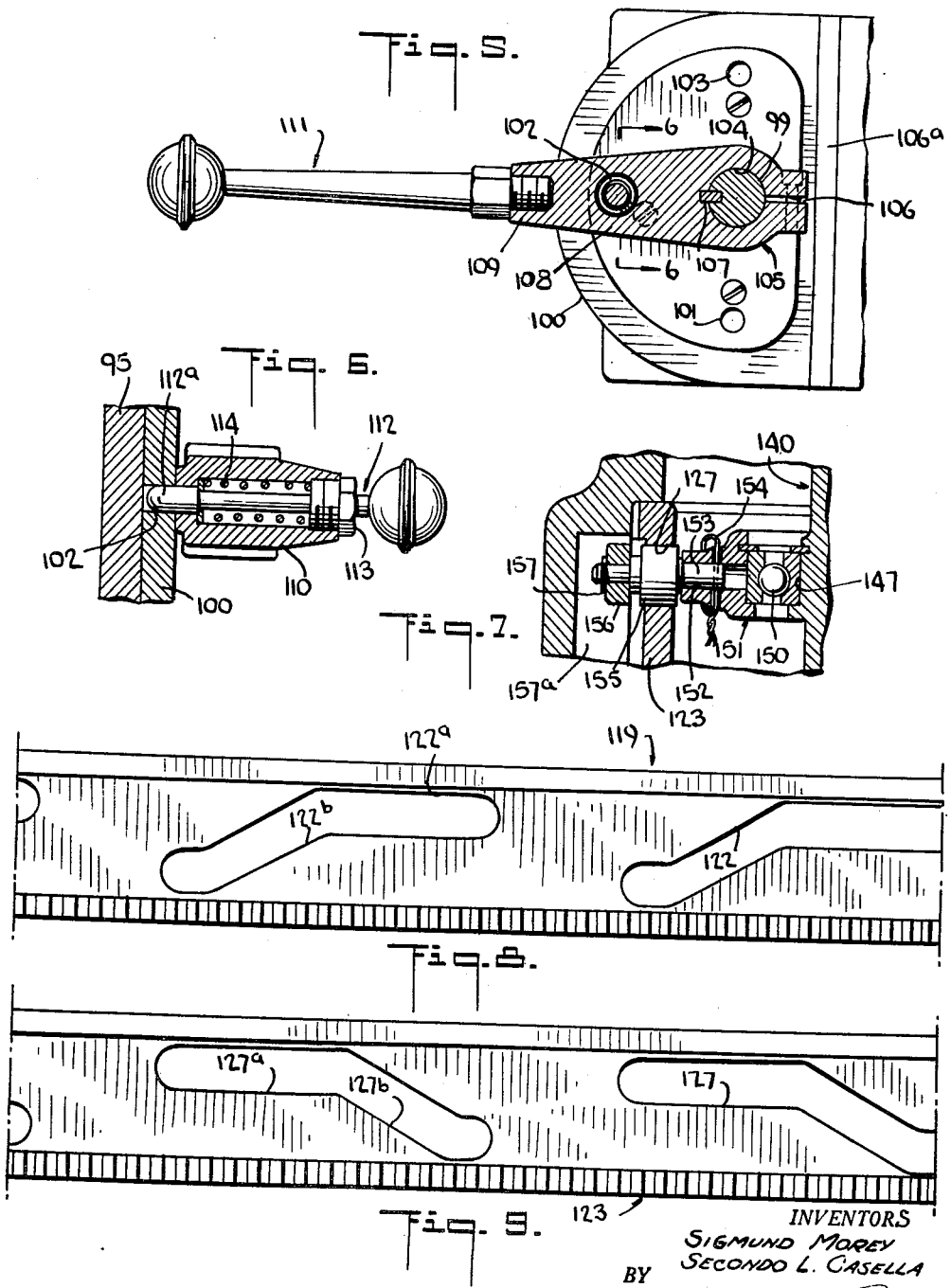

United States Patent Office 2,949,795
Patented Aug. 23, 1960

2,949,795
POWER TRANSMISSION FOR MILLING AND THE LIKE MACHINES

Sigmund M. Morey and Secondo L. Casella, New York, N.Y., assignors to Morey Machinery Co., Inc., Astoria, N.Y., a corporation of New York Filed June 11, 1956, Ser. No. 590,485

8 Claims. (Cl. 74—750)

This invention relates to an improved power transmission for milling and the like machines.

An object of this invention is to provide an improved transmission capable of interchanging three different speeds under the control of one lever to drive a milling or the like tool that may be raised and lowered in any of its speeds.

Another object of this invention shall be to provide a power transmission of the character described, comprising a drive shaft, a driven shaft coaxially slidable relative thereto, and a pair of planetary gear assemblies between said drive shaft and driven shaft to cause the driven shaft to operate at various speed ranges.

Still another object of this invention is to provide in a transmission of the character described, means whereby said pair of planetary gear assemblies may be repositioned by a pair of drum type cams under the control of a single handle.

A further object of this invention is to provide in a transmission of the character described, a drive shaft, a shaft coaxially slidable relative thereto, a casing movable longitudinally with the slidable shaft, a driven shaft in the casing coaxial and slidable with the slidable shaft for holding a tool, means in the casing connecting the slidable shaft with the driven shaft for rotating said driven shaft at a plurality of speed ranges, and means under the control of a single handle on the casing for shifting the drive from one speed range to another.

A yet further object of this invention is to provide a strong and durable device of the character described, that shall be relatively inexpensive to manufacture, and yet practical and efficient in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the appended claims.

In the accompanying drawings in which is shown various illustrative embodiments of this invention;

Fig. 2 is a cross-sectional view taken on the line 2—2 of Fig. 1;

Fig. 3 is a cross-sectional view taken on the line 3—3 of Fig. 2;

Fig. 4 is a cross-sectional view taken on the line 4—4 of Fig. 2;

Fig. 5 is a part sectional view taken on the line 5—5 of Fig. 2;

Fig. 6 is a part sectional view taken on the line 6—6 of Fig. 5;

Fig. 7 is a cross-sectional view taken on the line 7—7 of Fig. 3;

Fig. 8 is a developed view of one control drum cam of the invention; and

Fig. 9 is a developed view of a second control cam used in the invention.

Figure 1:
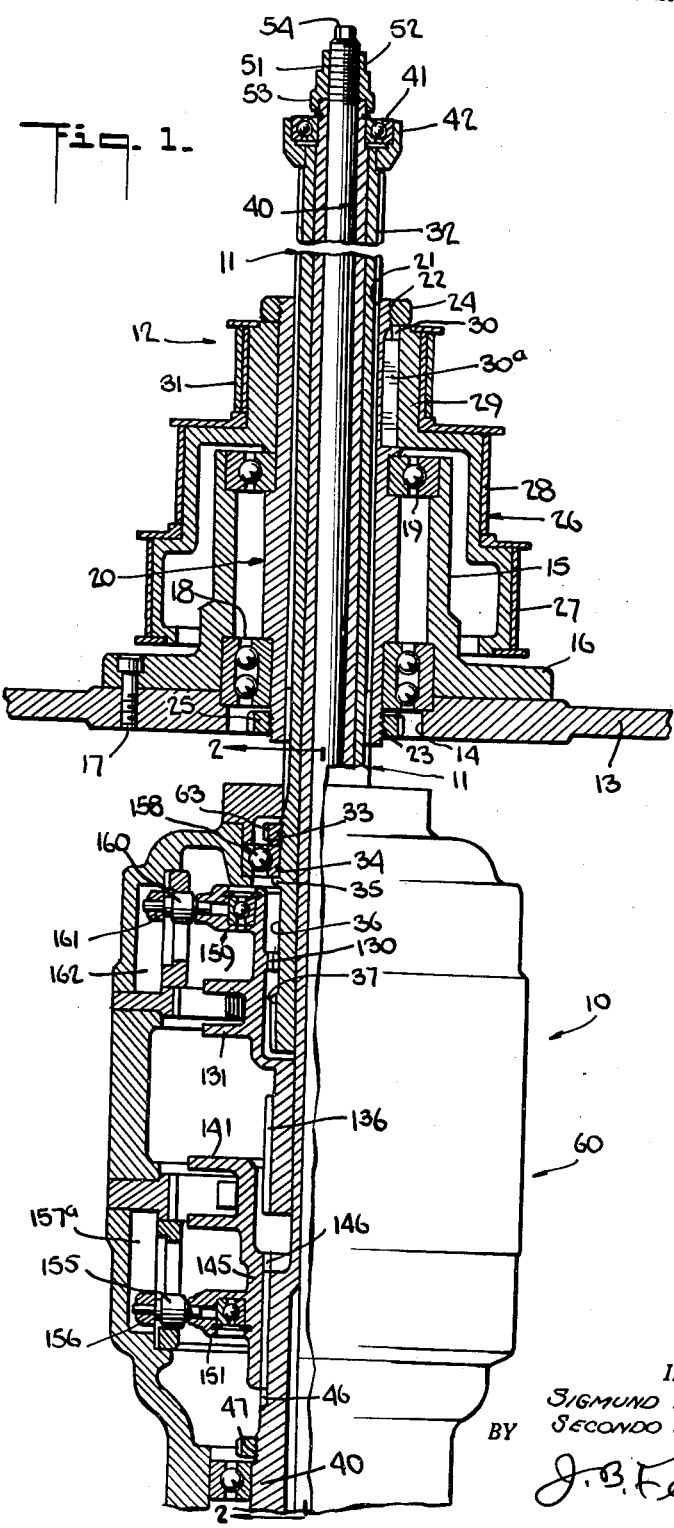
Fig. 1 is a part sectional view of a power pick up cone pulley connected to a transmission in accordance with the present invention.

Referring now in detail to the drawings, Fig. 1 shows a transmission 10 embodying the invention, connected by means of a central drive shaft 11 to a power take off cone pulley 12.

The cone pulley assembly 12 is mounted on a stationary fixed frame or wall 13. The fixed frame 13 has a central opening 14 through which the drive shaft 11 extends to the cone pulley. Circular drum housing 15 having an annular flange 16 is mounted over the opening 14 on the opposite side from the transmission. Bolts 17 secure said drum to frame 13. A double ring ball bearing 18 is mounted at the lower end of the drum 15 at the inside thereof, and a single ring ball bearing 19 is mounted at the upper end thereof. It is to be understood that the entire assembly is mounted vertically when in use, although this is not absolutely necessary for operation.

An internally ribbed sleeve 20 is mounted in the bearings 18 and 19 of drum 15 and extends upward beyond them with its internal ribs 21 running throughout its length. The external surfaces at each end of sleeve 20, are threaded as at 22 at the upper end and at 23 at the lower end thereof. A pair of internally threaded nuts 24 at the upper end, and 25 at the lower end, secure the sleeve 20 from vertical movement relative to the fixed frame 13. A cone pulley 26 having three steps 27, 28 and 29, with step 29 at the top end, is mounted to the upper end of sleeve 20 which extends above bearing 19. Step 29 is a close fit about the upper end of sleeve 20 and is fixed thereto by means of a pair of slots 30 with a key 30a inserted thereinto. Nut 24 contacts the top surface of pulley 26.

Belt 31 about step 29 of the cone pulley 26 may lead to any suitable power source (not shown).

Thus it may be seen that power from the belt 31 will drive cone pulley 26, by means of the key connection 30a and the pulley will drive sleeve 20. Sleeve 20 has internal ribs 21 meshing with external ribs 32 on the drive shaft 11.

The drive shaft 11 is hollow and tubular in construction. Ribs or spline teeth 32 of the drive shaft 11 extend only to the transmission 10. The drive shaft 11 has an external thread 33 at the point where it enters the transmission 10. Directly adjacent and below the external threads 33 is a bearing seat 34, and a short outward flange 35 below that. The outer surface of the drive shaft is smooth at 36 for a short length. Shaft 11 terminates with a short length of external spline teeth 37 constituting a splined sun shaft. Drive shaft 11 extends about ⅓ of the way into the transmission as shown in Fig. 2.

A driven shaft 40 is situated coaxially and rotatably within the drive shaft 11 and extends therebelow. A ball bearing 41 surrounds the outer surface of the driven shaft 40 at the upper end thereof where it extends slightly beyond the upper end of drive shaft 11. A collar 42 secures the outer race of ring bearing 41 and extends therebelow to the drive shaft 11. Thus, drive shaft 11 and driven shaft 40 are rotatably connected at the upper ends thereof.

The driven shaft 40, as seen in Fig. 2, may have oil grooves 43 cut thereon. The driven shaft 40 extends below the lower end 37 of the drive shaft forming section 44. Below section 44 the driven shaft 40 flares out to an enlarged diameter 45 having external spline gear teeth 46, likewise constituting a sun spline gear. The ribbed section 45 is about equal in length to smooth section 44. Below ribs 46 is a short externally threaded section 47, fitted with lock nut 47a. Below this is a smooth section 48 acting as a ball bearing ring seat. The driven shaft 40 then extends downwardly to the lower end of the assembly where it widens to form a chuck 50.

The chuck head 50 is also built to receive a double ring bearing. A spindle 51 extends from the chuck mouth through the center of the driven shaft and out above the upper ends of the drive shaft and the driven shaft. The upper end of the driven shaft 40 extends slightly beyond the upper roller bearing 41. An internally threaded cap 52 screwed to the protruding end of the spindle 51 has an overlapping flange 53 which holds down the driven shaft 40. The spindle may be finished off at its upper end in a hexagonal shape 54. The lower end of the spindle protruding into the chuck 50 may be threaded as at 55.

The entire transmission housing is cylindrical in shape, narrowing at the ends. The upper end of the housing 60 has a bearing seating 61 holding ring bearing 62 between the housing and the drive shaft 11. A nut 63 is screwed onto the drive shaft to hold down the bearing and a cap member 64 is bolted down by bolts 65 over the upper opening 61 of the transmission housing 60. The transmission housing 60 may be formed of several members bolted together as by bolts 66. At the upper section of the housing 60 is a cover member 67 which is formed with said opening 61. The inside of the housing cover 67 is shaped at 68 to receive a drum type cam 119 therewithin as will appear hereinafter. Housing 67 has an opening 69 at one side thereof to receive a gear wheel 117 described hereinafter.

Mounted over opening 69 is a housing 70 formed with an internal cavity 71 and a bearing opening 72 leading to the space 71. Cover housing 67 has a lower flange 67a which engages bolts 66.

Adjacent flange 67a and therebelow is a circular ring gear 73 having internal teeth 74. Adjacent the underside of gear 73 is a second section 75 of the gear housing 60 and a ring gear 76 having internal teeth 77 is located adjacent the bottom of the drum shaped section 75. An elongated section 78 of the transmission housing is situated adjacent the lower face of circular ring gear 76. Bolts 66 pass from the housing cover 67 through ring gear 73, section 75 of the housing, ring gear 76 and attach to section 78 of the housing. Section 78 may have an outwardly and upwardly extending portion 79 to serve for mounting the transmission. A portion of section 78, directly below gear 76, is drum shaped and internally machined to accommodate a drum type cam 123 at the inside surface 80 thereof, as will appear hereinafter.

An opening 81 is formed at one side of section 80. A surface 82 is adjacent this opening. A neck portion 83 narrows down casing portion 78 to the lower extended section 84 thereof. Between neck 83 and portion 84 is a ring bearing seat 85. Section 78 may also have reinforced mounting portion 86. The lower end of portion 78 has an internal annular ring 87, bearing seat 88, and an open end 89. The cover ring 90 over the opening 89 secures chuck 50 and is held to the casing by bolts 91. A double ring ball bearing 92 is seated between the bearing seat 88 and chuck 50. An oil guard collar 93 is mounted within ring 87. Double ring ball bearing 94 is mounted inbetween seating 85 and the driven shaft portion 48.

A second small housing 95 disposed below housing 70, is mounted over opening 81. Housing 95 has an internal chamber 96 with a pair of bearing openings 97, 98 on either side thereof. Opening 97 facing opening 72 of the housing 70, and opening 98 on the lower side.

Rod 99 extends from housing 70 through housing 95 and slightly beyond. Said rod is journalled in openings 72, 97, 98. A plate 100 receives rod 99 in bearing 104 and is fastened to the underside of housing 95 by screws 100a. Plate 100 has three through openings 101, 102 and 103 spaced equally from the central opening 104 through which the lower end of rod 99 passes. Openings 101, 102 and 103 are spaced 90° from each other. Gear shift bracket 105 is clamped to the lower end of rod 99 by means of the opening 104a which receives said lower end. Bracket 105 has a slit 106 at one side thereof. A bolt 106a clamps together split ends of the bracket 105. Rod 99 is keyed to bracket 105 by key 107. An arm 108 extends outwardly from the socket portion. Extending outwardly from arm 108 is a gear shift stick socket 109, and extending downwardly from arm 108 is a shift lock socket 110. A gear shift handle or lever 111 is screwed into socket 109. A shift lock rod 112 is slidably fitted to socket 110 (Fig. 6) and retained by nut 113. It has an upper pin head 112a adapted to enter one of openings 101, 102, 103. A spring 114 contacts pin head 112a at the upper end of lock rod 112 and is seated within a chamber in socket 110 against nut 113. The end 112a of the shift lock rod extends through socket 110 and is pushed by spring 114 into any of the holes 101, 102 or 103 that the socket 110 may overlie. Moving shift lever 111 will rotate rod 99. A gear wheel 115 is mounted on rod 99 within cavity 96 of housing 95 and the outer gear teeth 116 of gear 115 extend into hole 81. Mounted on the upper end of rod 99 within cavity 71 of housing 70 is gear wheel 117 having external gear teeth 118 extending into opening 69 of the transmission housing.

A drum cam 119 is seated within wall 68 of housing section 67 and is revolvable therein resting on gear 73. Cam 119 has two outward annular flanges 120 and 121, the latter of which has gear teeth. Gear 121 meshes with teeth 118 of gear wheel 117. Cam 119 is formed with a pair of identical opposite slot openings 122. A second drum cam 123 is mounted within the drum seating 80 of section 78 of the transmission housing 60. Drum cam 123 is revolvable within the transmission housing. It rests on an internal shoulder formed in casing section 78. It is formed with a pair of annular outwardly extending flanges 124 and 125. Cam 123 is formed with a pair of identical opposite openings 127. Flange 125 has outwardly extending gear teeth 126 meshing with gear teeth 116 of gear wheel 115. Thus, when lever 111 is moved, rod 99 will be rotated; therefore gears 115 and 117 will be rotated, thus rotating cams 119 and 123 together. Lock rod 112 must be drawn into socket 110 in order to move shift lever 111.

The transmission further comprises a pair of planetary gear trains operated by the drum cams 119 and 123. The first planetary gear train comprises planetary carrier 128 located in the upper section of the gear housing, coaxially mounted about drive shaft 11. Carrier 128 is formed at its upper end with a cylindrical sleeve 128a spaced from shaft 11. A bearing seat 129 is formed at the upper outside of the sleeve 128a. An internal spline tooth 130 is formed below the ring bearing seat 129 at the inside of the cylindrical sleeve 128a. Below this, the carrier has three sets of spaced outward flanges 131 which carry axles 132 to which are attached pinion gears 133 which have gear teeth 134 meshing with teeth 74 of ring gear 73 and with teeth 37 of drive shaft 11. Below the carrier flanges 131, the carrier narrows to neck 135. Neck 135 extends downwardly and is seated closely about the driven shaft 40. Neck 135 has spline teeth or ribs 136 formed on the outside thereof constituting a sun gear. The entire carrier 128 is slidable up and down on the driven shaft 40 and surrounding the drive shaft 11.

A second carrier 140 has a pair of planetary gear carrying flanges 141 at its upper end supporting three axles 142 on which are mounted three equiangularly spaced pinion gears 143. Pinion gears 143 have teeth 144 which mesh with teeth 136 of the first carrier 128.

Carrier 140 has a downwardly extending neck portion 145 below the planetary gear assembly. Neck 145 has spline teeth 146 formed at the inside thereof meshing with spline teeth or ribs 46 of driven shaft 40, and below this point is formed a bearing seat 147 and a short downwardly extending neck 148. A ball bearing ring 150 is seated on the bearing seat 147. A shifter ring 151 is mounted coaxially around bearing 150 as may be seen clearly in Fig 3. The shifter ring 151 is mounted rotatably on roller bearing 150 and is spaced inside of drum cam 123. At two points diametrically opposite each other, the shifter ring 151 is formed with a pair of sockets 152. This section of the shifter ring is shown in Fig. 7. A pin 153 is mounted within each socket 152 secured by retaining wire 154. A roller 155 is rotatably mounted on each pin 153 outside the circumference of the shifter ring 151. Said rollers 155 extend into the slots 127 of drum cam 123. Rollers 155 are held onto pins 153 by collars 156 secured by cotter pins 157 and slidably received in slots 157a in the casing.

When the gear 115 is rotated by means of moving the gear shift lever 111, the teeth 116 on ring 115 will rotate a drum cam 123, since the teeth 116 mesh with teeth 126. When drum cam 123 is rotated the slots 127 having the shape shown in Fig. 9, will move the rollers 155 of the shifter ring and therefore move the shifter ring. When the shift lever 111 is rotated in one direction so that the dwells 127a of slots 127 (see Fig. 9) are moved, by movement of the drum cam, no action will take place on carrier 145. However, when shift lever 111 is moved the opposite way, camming slot portions 127b of slots 127 on the drum cam will press against rollers 155 of the shifter ring. Since camming slot portions 127b are cut from one side of drum cam to the other, the rollers 155 will be moved from an upwards position to a lower position.

In Fig. 2 of the drawings, movement of shift lever 111 in one direction will cause the drum cam 123 to move from the position shown, to a position whereby the rollers 155 will be at the far end of dwells 127a of slots 127 in the drum cam. Since dwells 127a run circumferentially on the drum cam no movement of the shifter ring will take place. If the shift lever in Fig. 2 was moved in an opposite direction, camming slot portions 127b would move rollers 155 downwards, thus moving the shifter ring 151 downwards. Since the shifter ring 151 is connected by means of bearing 150 to carrier 140, the carrier always moves with the shifter ring, therefore such movement of gear shift stick 111 will move the second carrier 140 downwards to bring pinions 143 in mesh with the teeth 77 of ring gear 76.

The first carrier 128 has roller bearing 158 mounted on bearing seat 129. Mounted around ball bearing 158, is shifter ring 159 similar to ring 151. A roller 160 is mounted on each side of shifter ring 158 and they extend into slots 122 of drum cam 119. Also carried by shifter 159 are rollers 161 received in vertical seats 162 in the casing. It will be noted that slots 122 in drum cam 119 have dwell portions 122a and camming portions 122b running diagonally across the drum cam in an opposite direction from camming slots 127b of opening 127 in drum cam 123. Therefore, when the gear shift 111 is moved in one direction, while shifter ring 151 will remain stationary, the upper shifter ring 159 will move downwards thereby moving the upper carrier 128 downwards to disengage pinions 133 from teeth 74 of ring gear 73 and to engage teeth 130 with sun gear 37.

It may now be seen that when gear shift lever 111 is in neutral position, as illustrated in Fig. 2, the upper carrier 128 will be in its upwards position and the lower carrier 140 will be in its upwards position (as shown in Fig. 2). When the shift lever is moved in one direction the upper carrier will move downwards while the lower carrier remains at the same level. When the shift lever is returned to the inbetween or neutral position the carriers will return to the positions shown in Fig. 2. When the shift lever 111 is moved through an arc to its counter-clockwise stop, with the shift lock rod 112 in hole 101, the lower carrier 140 will move downwards to its lower position, but the upper carrier will remain at the same level as in Fig. 1.

The upper carrier 128 will remain in its upper position as shown in Fig. 1 since roller 160 will dwell 122a.

Three gear ratios can be had by shifting the carriers by the means disclosed.

In the position illustrated in Fig. 2, with the shift lever in center position, the drive will work as follows: Power from the drive shaft 11 is transmitted to the upper planetary carrier through gear teeth 37 at the bottom end of the drive shaft meshing with teeth 134 of the pinion gears 133. In this position the pinion gears also mesh with the outer ring gear 73. Therefore the carrier 128 will be rotated at a slower rate of speed than the drive shaft, said rate of speed being determined by the relative sizes of the gears enmeshed.

The ribbed neck or spline portion 136 of the upper carrier 128 extends downwardly to the spline teeth 146 of the lower carrier 140 and thereby rotates the lower carrier. The spline teeth 146 of the lower carrier mesh with the spline teeth 46 of the driven shaft 40. Thus, the speed of the upper carrier is transmitted to the driven shaft and the chuck 50 will be driven at the speed reduction of the first carrier from the drive shaft 11.

In the second position the shift lever is moved so that the lock rod 112 fits into hole 103 on the face plate. Then the upper carrier will move downwards bringing its internal spline teeth 130 in contact with the spline teeth or ribs 37 of the drive shaft. Thus the upper carrier 128 will rotate at the same speed as the drive shaft. The lower spline teeth or ribs 136 will remain in contact with spline teeth 146 of the lower carrier and thereby rotate the lower carrier at the same speed as the upper carrier; and the lower carrier through teeth 149 will mesh with spline teeth 46 of the driven shaft and the driven shaft will be rotated at exactly the speed of the drive shaft. Pinion gears 133 of the upper carrier will be brought downward in this position out of contact with gear ring 73 and have no effect upon the drive. In the third and final position, when shift lever 111 is moved in a counter-clockwise position so that lock rod 112 engages hole 101 of the face plate, the upper carrier will be returned to the position of Fig. 2 and the lower carrier dropped to its downward position (Fig. 1) in which the pinion gears 143 of the lower carrier mesh with ring gear 76 causing a reduction of speed between the upper carrier driving the pinion 143 through teeth 136 and the lower carrier itself. The gear ring 146 will be dropped downwardly and have no effect on the motion since it will no longer engage with teeth 136. The first gear reduction in the third position will be accomplished by the upper carrier, as already described, when in the position shown. The second gear reduction will be of the planetary gearing on carrier 140 which will also be transmitted to the driven shaft through teeth 146 meshing with teeth 46 as previously described. Thus, three speeds may be had.

It may be noted that in Fig. 1 the entire transmission may be brought upwards and downwards while the cone pulley remains stationary since the transmission is attached to the cone pulley only through ribs 32 meshing with teeth 21 so that drive shaft 11 may be slipped up and down in the cone pulley.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. In combination, a casing, a drive shaft rotatable and non-slidable therein, a driven shaft coaxial with the drive shaft and rotatable and non-slidable in the casing, a splined sun on the drive shaft, a first planet carrier mounted for rotation and sliding movement in the casing coaxially with respect to the drive shaft and movable to an upper position and to a lower position, pinions on said carrier meshing with said splined sun in both the upper and lower positions of said carrier, a ring gear fixed with respect to said casing and adapted to mesh with said pinions in the upper position of said carrier, and to be clear of said pinions in the lower position of said carrier, internal spline teeth on said carrier adapted to be clear of said splined sun in the upper position of said carrier and to mesh with said splined sun in the lower position of said carrier, a splined sun on said carrier, said driven shaft having a splined sun, a second carrier slidably and rotatably mounted in said casing coaxially of said driven shaft, and likewise movable to an upper position and a lower position, and having internal spline teeth slidably meshing with the splined sun on said driven shaft in both the upper and lower positions of said second carrier, pinions carried by said second carrier meshing with the splined sun on said first carrier in both the upper and lower positions of said second carrier, a ring gear fixed with respect to said casing and meshing with said pinions on said second carrier in the lower position of said second carrier, and being clear of said pinions in the upper position of said second carrier, and said splined sun on said first carrier being clear of the internal spline teeth of the second carrier when both carriers are in their upper positions, and when the first carrier is in its upper position, and the second carrier is in its lower position, and adapted to mesh therewith when the first carrier is in its lower position and the second carrier is in its upper position.

2. The combination of claim 1, and means to selectively bring either both carriers to their upper positions, or the first carrier to an upper position and the second carrier to a lower position, or the first carrier to its lower position and the second carrier to its upper position.

3. The combination of claim 2, said means comprising a pair of drums rotatable and non-slidable in said casing, means to rotate said drums simultaneously in the same direction, said drums being provided with cams, and a pair of shifter means rotatable and non-slidably mounted on said pair of carriers, respectively, and non-rotatably and slidably engaging said casing, and engaging said cams, respectively, for controlling the vertical movements of said carriers upon rotating said drums.

4. In combination, a fixed support, a shaft rotatably and non-slidable mounted thereon, a second shaft coaxial with respect to the first shaft, means to connect said second shaft to the first shaft for sliding movement with respect thereto and for rotation therewith, a non-rotatable casing mounted for sliding movement together with the second shaft and having means to journal the second shaft, a third shaft coaxial with the second shaft and disposed within said casing, and means connecting the second shaft to said third shaft for rotating said third shaft at different speeds relative to the second shaft, said connecting means comprising a pair of planetary gear trains, said planetary gear trains comprising a pair of ring gears fixed with respect to the casing, a pair of planet carriers slidable with respect to the second shaft, and means on the casing to control the sliding movement of said carriers.

5. The combination of claim 1, in combination with an upper drum rotatably and non-slidably mounted in the casing and surrounding a portion of the first carrier, a second drum rotatably and non-slidably mounted in the casing and surrounding the second carrier, a cam slot in each drum, a shifter ring rotatably and non-slidably mounted on the first carrier, and having means engaging in the cam slot in the first drum, and also means slidably and non-rotatably engaging the casing, a shifter ring rotatably and non-slidably mounted on the second carrier and having means engaging the cam slot in the second drum and also means slidably and non-rotatably engaging said casing.

6. The combination of claim 5, the cam slot in the upper drum comprising a dwell portion from one side of which extends a downwardly inclined cam portion extending in one direction, the cam slot in the lower drum comprising a downwardly inclined cam portion extending in an opposite direction, and aligned with the dwell portion of the cam slot in the supper drum, and a dwell portion extending from the inclined portion of the cam slot in the lower drum, and aligned with the inclined portion of the cam slot in the upper drum.

7. The combination of claim 6, said drums being provided with gear teeth, a shaft rotatably mounted on the casing parallel to the first, second and third shafts, pinions on said parallel shafts meshing with the gears on said drums, and a handle fixed to the vertical shaft for rotating the latter.

8. The combination of claim 7, and inter-engaging means on said handle and casing to retain said drums in a plurality of angular positions.

References Cited in the file of this patent

UNITED STATES PATENTS

| 1,416,777 | Bayrer | May 23, 1922 |
| 1,735,398 | Hoagland | Nov. 12, 1929 |
| 2,297,433 | Roloff | Sept. 29, 1942 |
| 2,415,569 | Smith | Feb. 11, 1947 |
| 2,687,050 | Brown | Aug. 24, 1954 |
| 2,787,919 | Senkowsk | Apr. 9, 1957 |

FOREIGN PATENTS

| 413,640 | Italy | Mar. 21, 1946 |
| 288,243 | Italy | Sept. 1, 1931 |